United States Patent [19]

Campbell

[11] Patent Number: 4,537,693
[45] Date of Patent: Aug. 27, 1985

[54] LUBRICATING OIL COMPOSITIONS CONTAINING METHYLOL POLYETHER AMINO ETHANES

[75] Inventor: Curtis B. Campbell, Rodeo, Calif.

[73] Assignee: Chevron Research Company, San Francisco, Calif.

[21] Appl. No.: 499,132

[22] Filed: May 31, 1983

[51] Int. Cl.$^3$ .............................................. C20M 1/32
[52] U.S. Cl. ................................................ 252/51.5 R
[58] Field of Search .................................... 252/51.5 R

[56] References Cited

U.S. PATENT DOCUMENTS

| | | | |
|---|---|---|---|
| 3,428,682 | 2/1969 | Egan et al. | 260/567.6 |
| 3,437,693 | 4/1969 | Frump | 252/51.5 R X |
| 3,456,013 | 7/1969 | Egan et al. | 252/51.5 R X |
| 3,637,358 | 1/1972 | Cyba | 44/72 |
| 3,849,083 | 11/1974 | Dubeck | 44/72 |
| 3,960,965 | 6/1976 | Battersby et al. | 260/584 |
| 4,168,242 | 9/1979 | Soula | 252/51.5 R |
| 4,170,560 | 10/1979 | Lowe | 252/51.5 R X |
| 4,252,746 | 2/1981 | Kwong | 252/51.5 R X |
| 4,261,704 | 4/1981 | Langdon | 44/62 |
| 4,332,555 | 6/1982 | Herbstman et al. | 44/72 |

*Primary Examiner*—William R. Dixon, Jr.
*Assistant Examiner*—Cynthia A. Prezlock
*Attorney, Agent, or Firm*—S. R. LaPaglia; Q. T. Dickinson; G. F. Swiss

[57] ABSTRACT

Additives for lubricating oils for internal combustion engines which contribute dispersancy and detergency to the lubricating oils are disclosed. The additives are hydrocarbyl methylol poly(oxyalkylene) amino ethanes comprising a hydrocarbyl-terminated methylol poly(oxyalkylene) chain of 2 to 4 carbon oxyalkylene units bonded to an ethane or substituted ethane chain in turn bonded to a nitrogen atom of an amine or polyamine having from 1 to 12 amine nitrogens and from 2 to 40 carbon atoms.

8 Claims, No Drawings

4,537,693

LUBRICATING OIL COMPOSITIONS CONTAINING METHYLOL POLYETHER AMINO ETHANES

BACKGROUND OF THE INVENTION

1. Field of the Invention

This application relates to lubricating oil compositions containing hydrocarbyl methylol poly(oxyalkylene) amino ethanes which contribute despersancy and detergency to the compositions.

Lubricating oil compositions, particularly for use in internal combustion engines, have long performed many functions other than simply lubricating moving parts. Modern-day, highly compounded lubricating oil compositions provide anti-wear, anti-oxidant, extreme-pressure and anti-rust protection in addition to maintaining the cleanliness of the engine by detergency and dispersancy. Many lubricating oil additives are well known for accomplishing these functions. For maintaining engine cleanliness, a well-known class of ashless detergents which have been found to be particularly useful are polyoxyalkylene carbamates. U.S. Pat. Nos. 4,160,648 and 4,247,301 disclose and claim fuel compositions containing certain poly(oxyalkylene) aminocarbamates and polyoxyalkylene polyamines as deposit control additives. While, in general, deposit control additives are not believed to be useful dispersants for lubricating oil compositions generally, certain aminocarbamates and certain polyether amines are useful in this regard. U.S. application Ser. No. 403,606, now U.S. Pat. No. 4,438,022 filed July 30, 1982 discloses polyether polyamine ethanes as lubricating oil dispersants.

SUMMARY OF THE INVENTION

It has been found that improved lubricating oil compositions comprise a major amount of an oil of lubricating viscosity and an amount sufficient to provide dispersancy of hydrocarbyl methylol poly(oxyalkylene) amino ethanes of molecular weight from about 300 to about 2,500, and preferably from about 800 to about 1,500 and having at least one basic nitrogen atom; wherein poly(oxyalkylene) moiety is composed of oxyalkylene units selected from 2 to 4 carbon epoxide units and containing at least sufficient branched chain oxyalkylene units to render said additive soluble in said lubricating oil composition. The polyoxyalkylene chain is bonded through a terminal oxygen to an ethane or substituted ethane chain or connecting group which is in turn bonded to the nitrogen atom of an amine or polyamine having from 1 to about 12 amine nitrogens and about 2 to about 40 carbon atoms with a carbon-nitrogen ratio of between 1:1 and 10:1. The hydrocarbyl-terminating group contains from 1 to 30 carbon atoms and is bonded to the polyoxyalkylene units through an ether oxygen atom.

DETAILED DESCRIPTION OF THE INVENTION

The present invention herein consists of a hydrocarbyl methylol polyoxyalkylene amino ethane, and a lubricating oil composition containing a major amount of oil of lubricating viscosity and from about 0.01 to about 10 weight percent of said additive. The methylol polyoxyalkylene amino ethane has a molecular weight of from about 300 to about 2500 and preferably from about 800 to about 1500. The composition consists of three parts or moieties. One is the amino moiety, the second the methylol poly(oxyalkylene) moiety comprising at least one hydrocarbyl-terminated methylol polyoxyalkylene polymer, bonded through the third moiety, an ethane connecting group or linkage, connected in turn to the nitrogen atom of the amine or polyamine.

As a dispersant, the polyoxyalkylene moiety, the amino moiety, and the ethane moiety are selected to provide solubility in the oil composition and dispersant activity without contributing to deposit formation. The additives may be termed hydrocarbyl methylol poly(oxyalkylene) amino ethanes or for convenience, "methylol polyether amino ethanes". The additives may be prepared from the reaction of a suitable halogenating agent containing the desired ethane moiety, such as ethylene chlorohydrine, with the appropriate substituted epoxide, polymerizing to the polyoxyalkylene chain. This is in turn reacted with a longer chain epoxide containing the appropriate hydrocarbyl cap, which is followed by reaction of the capped polyether chloride with the appropriate polyamine to form the active composition. The initial epoxide reaction is carried out at relatively low temperatures, i.e., 0° C. and under; while the second epoxide reaction is carried out at higher temperatures relative to the first, e.g., 20° C. to 80° C.

Poly(oxyalkylene) Component

The polyoxyalkylene moiety is ordinarily prepared by the reaction of an appropriate epoxide with an appropriate chlorohydrin containing the desired ethane connecting group. In the preferred embodiment ethylene chlorohydrin is used, which is reacted under polymerization conditions with the lower alkylene oxides or oxiranes containing from 2 to 4 carbon atoms, such as ethylene oxide, propylene oxide or butylene oxide. The resulting poly(oxyalkylene) polymer contains at least one oxyalkylene unit, preferably 1 to 30 units, more preferably 5 to 30 units and most preferably 10 to about 25 oxyalkylene units.

In the polymerization reaction, a single type of alkylene oxide may be employed. Copolymers, however, are equally satisfactory and random copolymers are readily prepared by contacting the ethylene chlorohydrin compound with a mixture of alkylene oxides. Blocked copolymers of oxyalkylene units also provide satisfactory polyoxyalkylene polymers for the practice of the present invention. Blocked copolymers are prepared by reacting the chlorohydrin with first one alkylene oxide and then the other in any order, or repetitively, under polymerization conditions.

The reaction is promoted or "catalyzed" by the use of an appropriate Lewis acid or protic acid catalyst, examples of which include boron trifluoride:diethyletherate ($BF_3OEt_2$), aluminum trichloride ($AlCl_3$); para-toluene sulfonic acid, and trifluoromethane sulfonic acid. This initial reaction is carried out at relatively low temperatures, i.e., from about −60° C. to about 0° C. and allowed to warm slowly to room temperature after 80% to 99% of the epoxide has reacted, approximately two hours to eight days.

1-Methylol Hydrocarbyl Cap

The polyoxyalkylene moiety is capped with a 1-methylol hydrocarbyl group. This is accomplished by warming the polyoxyalkylene moiety in the presence of the catalyst to between 20° C. to 80° C. and adding an epoxide containing the desired hydrocarbyl group. The hydrocarbyl group includes branched or straight chain 5 to 30 carbon alkyl groups optionally substituted with hetero atoms, including hydroxyl, amino, or halo groups. These epoxides may have the epoxide ring at one end of the molecule or at some intermediate point in the alkyl group.

The 1-methylol hydrocarbyl cap may include a short polyoxyalkylene group having from 0 to 4, more preferably 0 to 1 oxyalkylene unit terminating with the 1-methylol hydrocarbyl group. The oxyalkylene units contain from 5 to about 30 carbon atoms.

The terminal oxygen atom in the polyoxyalkylene chain is bound to the ethane or substituted ethane connecting group, which is in turn bound to a nitrogen atom of the amine or polyamine.

In general, the poly(oxyalkylene) compounds are mixtures of compounds that differ in polymer chain length. However, their properties closely approximate those of a polymer represented by the average composition and molecular weight.

Ethane Moiety

The ethane connecting group ordinarily consists of a 2-carbon chain, or a 2-carbon chain with branched units extending from these carbons atoms. The branches of the connecting group consist of low molecular weight alkyl groups of up to 5 carbon atoms. Additionally, in the present invention, when the ethane connecting group contains branched alkyl groups, the branched groups will not contain the same number of carbon atoms as those extending from the oxyalkylene units of the polyoxyalkylene moiety.

Amine Component or Moiety

The amine moiety of the polyether amino ethane is preferably derived from ammonia or, more preferably, from a polyamine having from about 2 to about 12 amine nitrogen atoms and from about 2 to about 10 carbon atoms. The polyamine preferably has a carbon to nitrogen ratio of from about 1:1 to about 10:1. The polyamine will contain at least 1 primary or secondary amine nitrogen atom. The polyamine may be substituted with a substituent group selected from (A) hydrogen; (B) hydrocarbyl groups from about 1 to about 10 carbon atoms; (C) acyl groups from about 2 to about 10 carbon atoms; and (D) monoketo, monohydroxy, monocyano, lower alkyl and lower alkoxy derivatives of (B), (C). "Lower", as used in lower alkyl and lower alkoxy, means a group containing about 1 to 6 carbon atoms. "Hydrocarbyl" denotes an organic radical composed of carbon and hydrogen which may be aliphatic, alicyclic, aromatic or combinations thereof, e.g. aralkyl. Preferably, the hydrocarbyl group will be free of aliphatic unsaturation, i.e., ethylenic and acetylenic, particularly acetylenic unsaturation. The substituted polyamines of the present invention are generally, but not necessarily, N-substituted polyamines. The acyl groups falling within the definition of the aforementioned (C) substituents are such as propionyl, acetyl, etc. The more preferred substituents are hydrogen, $C_1$ to $C_6$ alkyls, and $C_1$–$C_6$ hydroxyalkyls.

The more preferred polyamines finding use within the scope of the present invention are polyalkylene polyamines, including alkylene diamine and including substituted polyamines, e.g. alkyl and hydroxyalkyl substituted polyalkylene polyamines. Preferably the alkylene groups contain from 2 to 6 carbon atoms, there being preferably from 2 to 3 carbon atoms between the nitrogen atoms. Such groups are exemplified by ethyleneamines and include ethylene diamine, diethylene triamine, di(trimethylene) triamine, dipropylenetriamine, triethylenetetramine, etc. Such amines encompass isomers which are the branched-chain polyamines and the previously mentioned substituted polyamines, including hydroxy and hydrocarbyl-substituted polyamines. Among the polyalkylene polyamines, those containing 2 to 12 amine nitrogen atoms and 2 to 24 carbon atoms, are especially preferred and the $C_2$ to $C_3$ alkylene polyamines are most preferred, in particular, the lower polyalkylene polyamines, e.g. ethylene diamine, tetraethylenepentamine, etc.

In many instances a single compound will not be used as reactant in the preparation of the compositions of this invention, in particular the polyamine component. That is, mixtures will be used in which one or two compounds will predominate with the average composition indicated.

Compositions

The final compositions comprising the present invention are prepared by the reaction of the hydrocarbyl terminated methylol polyoxyalkylene halo ethane moiety, with ammonia or with the appropriately selected polyamine. The basic substitution reaction yields the attachment of the amine or polyamine to the polyoxyalkylene and the elimination of hydrogen halide.

The class of preferred methylol polyether amino ethanes may be described by the following formula:

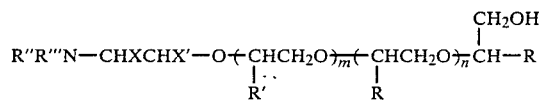

where R = a 5 to 30 carbon aliphatic, olefinic or alkylaryl group, which may be branched or straight chain and which may be substituted with hetero substituents selected from hydroxyl, amine, or halo groups;

where R′ = hydrogen, $CH_3$—$C_2H_5$—;

where R″ and R‴ independently = hydrogen or

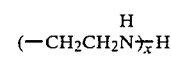

wherein x = 0 to 5;

where x and x′ independently = H, or alkyl groups of up to 5 carbons, and are different from R′.

where m = 1 to 30 oxyalkylene units; and where n = 0 to 4 oxyalkylene units.

The oils which find use in this invention are oils of lubricating viscosity derived from petroleum or synthetic sources. Oils of lubricating viscosity normally have viscosities in the range of 35 to 50,000 Saybolt Universal Seconds (SUS) at 100° F. and more usually from about 50 to 10,000 SUS at 100° F. Examples of such base oils are naphthenic bases, paraffin base and mixed base mineral oils, synthetic oils, for example, alkylene polymers, such as the polymers or propylene, butylene, etc. and mixtures thereof.

Usually included in the oils besides the subject additives are such additives as dispersants/detergents, rust inhibitors, antioxidants, oiliness agents, foam inhibitors, viscosity index improvers, pour point depressants, etc. Usually, these other additives will be present in amounts of from about 0.5 to 15 weight percent of the total composition. Generally, each of the additives will be present in the range from about 0.01 to 5 weight percent of the total composition.

It is also contemplated that the methylol polyether amino ethanes may be used as concentrates, and could be used as additive to fuels or lubricating oils subsequent to their preparation. In concentrates, the weight percent of these additives will usually range from about 0.3 to 50 weight percent. The concentrate would ordinarily comprise an inert stable oleophilic organic solvent and the carrier of said solvent boiling in the range of from about 150° to 400° F. and the concentrate would preferably contain from about 10 to 50 weight percent of the methylol polyether amino ethane compound.

The following examples are presented to illustrate a specific embodiment of the practice of this invention and should not be interpreted as a limitation upon the scope of that invention.

EXAMPLE 1

Twelve grams (0.15 mole) chloroethanol was added to 200 ml $CH_2Cl_2$ in a 2-liter, round-bottom flask, equipped with a magnetic stirrer, a thermometer, an addition funnel, and a $N_2$ atmosphere. The mixture was cooled in an ice/salt bath to approximately 0° C. After about 10 minutes, 4.0 grams (0.03 mole) boron trifluoride: diethyletherate ($BF_3OEt_2$) was quickly added with stirring. 184 grams (2.55 mole) butylene oxide was then added slowly, over approximately two and one-half hours, while keeping the temperature below 10° C. The reaction was continuously stirred and the amount of butylene oxide remaining was monitored by gas chromatograph until less than 1% remained—approximately two and one-half hours.

The temperature was then increased to approximately 30° C., and 45 grams (0.19 mole) of $C_{16}$ alpha olefin epoxide (hexadecenyl epoxide) was added rapidly to the above product. The mixture was stirred for one and one-half hours at reflux temperature, cooled to room temperature, quenched with 50 ml of methanol and the reaction placed in a separation funnel. The mixture was then extracted first with 50 ml water and then 50 ml saturated $NaHCO_3$ solution. The mixture was then washed three times with $H_2O$. The product was dried over Mg $SO_4$, filtered, and stripped, yielding 188 grams of a clear oil: Hydroxyl Number=40; Cl=2.15%.

170.08 grams (0.19 mole) of the above product was placed in a 2-liter, round-bottom flask, equipped with a magnetic stirrer, a thermometer, and a $N_2$ atmosphere. 881 grams (14.7 mole) of ethylene diamine was added to the flask. The temperature was increased to 80° C. The progress of the reaction was monitored by thin layer chromatography and permitted to react for approximately seven days, then diluted with ether and washed with water. The product was dried over $K_2CO_3$, filtered and stripped, yielding 155 grams of product. Total Nitrogen=1.50%; Basic Nitrogen=1.49%.

EXAMPLE 2

The same procedure as detailed in Example 1 was followed except that 95 grams (0.4 mole) of $C_{16}$ alpha olefin epoxide (hexadecenyl epoxide) was added following the reaction of all of the butylene oxide. 242 grams of the final product was yielded: Basic Nitrogen=1.23%.

EXAMPLE 3

Thirty-six grams (0.45 mole) chloroethanol was added to 600 ml $CH_2Cl_2$ in a 2-liter, round-bottom flask, equipped with a mechanical stirrer, a thermometer, an addition funnel and a $N_2$ atmosphere. The mixture was cooled in a dry ice/acetone bath to approximately −30° C. and 10.9 grams (0.08 mole) boron trifluoride:diethyletherate was quickly added with stirring. 536 grams (7.4 mole) of butylene oxide was then added over an 11-hour period.

The reaction was continuously stirred and the amount of butylene oxide remaining was monitored by gas chromatography until less than 1% remained—approximately five days. the temperature was increased to room temperature and stirred for two days. The mixture was extracted first with water and then with saturated $NaHCO_3$ solution. The mixture was then washed three times with water. The product was dried over anhydrous Mg $SO_4$, filtered and stripped to yield 571 grams of a clear oil: Hydroxyl Number=47; Cl=2.35%.

Twenty-five grams of the above product was added to 30 ml $CH_2Cl_2$ in a 250 ml round-bottom flask, equipped with a magnetic stirrer, a thermometer and a $N_2$ atmosphere. The reaction was cooled to 2° C. in an ice/salt bath and 0.5 grams (0.03 mole) of boron trifluoride:diethyletherate was quickly added. After about five minutes, the mixture was heated to 35° C. and 6.6 grams (0.03 mole) of $C_{16}$ alpha olefin epoxide (hexadecenyl epoxide) was added in two minutes. The reaction temperature was increased to 45° C. and stirred two hours. The mixture was then cooled to room temperature and quenched with methanol. The mixture was then washed with 50 ml water, then 50 ml saturated $NaHCO_3$ solution and finally three times with water. The product was dried over anhydrous $K_2CO_3$, filtered and stripped to give 28 grams of a clear oil: Hydroxyl Number=39; Cl=2.22%.

All specific embodiments of the invention have been described in detail. It should be understood that the invention is to be given the broadest possible interpretation within the terms of the following claims.

What is claimed is:

1. A lubricating oil composition comprising a major portion of oil of lubricating viscosity, and an amount sufficient to provide dispersancy of a hydrocarbyl methylol polyoxyalkylene amino ethane of molecular weight from about 300 to about 2500; wherein said hydrocarbyl group contains from 5 to about 30 carbon atoms, said polyoxyalkylene moiety comprises 1 to 30 oxyalkylene units selected from oxyalkylene units having from 2 to 4 carbon atoms, said ethane moiety is a two carbon chain, or a two carbon chain substituted with one or two lower alkyl units of up to 5 carbon atoms each with the proviso that the alkyl units contain a different number of carbon atoms as those extending from the oxyalkylene units of the polyoxyalkylene moiety and said amino moiety is a polyamine which comprises from 2 to about 12 amine nitrogen atoms and from about 2 to 40 carbon atoms.

2. A lubricating oil composition according to claim 1 in which said oxyalkylene units are selected from oxyalkylene units having from 3 to 4 carbon atoms.

3. A lubricating oil composition according to claim 1 in which said hydrocarbyl polyoxyalkylene polyamine ethane has a molecular weight of about 800 to about 1500.

4. A lubricating oil composition according to claim 1 in which said hydrocarbyl group contains from 5 to 20 carbon atoms.

5. A lubricating oil composition according to claim 1 in which said ethane moiety contains 2 to 4 carbon atoms.

6. A lubricating oil composition according to claim 1 in which said polyamine moiety is derived from lower polyalkylene polyamines and contains at least one primary or secondary amine nitrogen atom.

7. A lubricating oil composition according to claim 6 in which said lower polyalkylene polyamine is ethylene diamine or diethylene triamine.

8. A lubricating oil according to claim 1, 2, 3, 4, 5, 6, or 7 in which said minor amount of said hydrocarbyl polyoxyalkylene polyamine ethane comprises about 0.01 to about 10 weight percent of the total composition.

* * * * *